US005361668A

United States Patent [19]

Andersen et al.

[11] Patent Number: 5,361,668

[45] Date of Patent: Nov. 8, 1994

[54] VALVE FOR BRASS INSTRUMENT

[75] Inventors: James H. Andersen, Kenosha; Gregory C. Hilliard; Lawrence V. Ramirez, II, both of Elkhorn, all of Wis.; Michael W. Suter, Allen Park, Mich.

[73] Assignee: G. Leblanc Corporation, Kenosha, Wis.

[21] Appl. No.: 83,839

[22] Filed: Jun. 25, 1993

[51] Int. Cl.[5] .................. G01D 9/04

[52] U.S. Cl. .................. 84/392

[58] Field of Search .................. 84/390, 392, 394, 395, 84/396

[56] References Cited

U.S. PATENT DOCUMENTS

| | | | |
|---|---|---|---|
| 461,131 | 10/1891 | Pietz | 84/392 |
| 530,781 | 12/1894 | Leland | 84/392 |
| 4,685,372 | 8/1987 | Kawasaki | 84/392 |

OTHER PUBLICATIONS

Thayer Axial Flow Valve-2 sheets; Aug. 27, 1984.

Prior Art Disc-shaped valve (undated).

Yamaha Product Sheet W155 of Jan. 22, 1991.

*Primary Examiner*—Michael L. Gellner
*Assistant Examiner*—Patrick J. Stanzione
*Attorney, Agent, or Firm*—Jansson & Shupe, Ltd.

[57] ABSTRACT

The disclosure involves a valve for a brass instrument, e.g., a trombone, having an outer casing and a rotatable piston with first and second outer passages and a central passage between the outer passages. Two pairs of tubes are connected to the casing with each tube of a pair being coextensive with the other tube of that pair. At least one and preferably each outer passage is coextensive with a pair of tubes when the piston is in the switched position. The valve thereby affords "straight through" air flow during that valve position at which the trombone air column is longer or longest. Air flow resistance is thus reduced and the musician experiences a better "feel" when playing lower register notes, particularly when doing so at increased volume. A method for making the new valve, which is substantially hollow and lightweight, is also disclosed.

20 Claims, 9 Drawing Sheets

VALVE FOR BRASS INSTRUMENT

FIELD OF THE INVENTION

This invention relates to music and, more particularly, to musical instruments.

BACKGROUND OF THE INVENTION

It has been common knowledge for centuries that air columns of differing length produce musical notes of differing pitch. An example of an instrument based upon this principle is a pipe organ. Such organs have a multiplicity of pipes of varying lengths (as well as diameters) but the length of a particular pipe (and the air column therein) does not change.

Other examples include cornets and trumpets which use linearly-actuated valves and French horns which use rotary valves, all to change the note(s) produced by the instrument. In these latter examples, such note changes are by valving tubing of various lengths into or out of the air column "circuit," thus changing the length of the air column as measured from the instrumentalist's lips to the bell from which sound is emitted.

Trombones and tubas are yet other examples of instruments producing different notes by changing the air column length. A trombone uses a telescoping handslide to change the length of the air column. And many trombones (often referred to as slide trombones) use only a handslide for that purpose.

(By way of parenthetical background, it should be appreciated that the lower the note being played with, for example, a trombone, the longer is the air column and the more difficult it is for the musician to achieve "volume" in the note being played. This is so because the longer air column creates increased resistance to air passage.)

A feature of a slide trombone is that the handslide must often be manipulated very rapidly between notes. And, sometimes, it must be manipulated quickly over a relatively great distance as, for example, when playing a higher note (at which time the handslide is close to the musician's face and fully telescoped or nearly so) followed immediately by a low note requiring the handslide to be extended well away from the musician.

To help reduce the time required to play certain sequential notes, rotary valves have been developed to switch one or more lengths of tubing into and out of the instrument air column. This quickly effects a change in air column length (and, therefore, a note change) by valve manipulation rather than by handslide manipulation.

It is believed that the first rotary valve was invented in about 1832 by one Mr. Joseph Riedl of Vienna, Austria and in any event, disc-shaped rotary valves have been in wide use since at least as early as the late 1930's. Such valves are mounted on the instrument so that a flat, circular surface is toward the musician's cheek and does not interfere with or touch the musician's cheek.

Although rotary valves solved one problem, they were attended by new problems. For example, common disc-shaped rotary valves have pieces of tubing (those switched into and out of the circuit by the valve) fastened to the valve casing generally radially and using rather sharp bends. And the internal valve passages themselves involved some rather sharp bends. These "convolutions" in the air flow path add yet additional resistance to the musician's "blowing power." Thus, they not only further limit the maximum volume that a musician can obtain, they also have some undesirable effect on tonal quality.

Yet another difficulty with known rotary valves is that even though the stationary tubing attached to the valve casing is circular in cross-section, the passages in the rotating valve piston are often ellipsoid (or, perhaps of some other shape) but not circular. As a result, there is an abrupt flow discontinuity where the non-circular passage and the circular tube intersect. The tonal quality of the instrument is thereby adversely affected. Such a valve is said to lack "flow tangency."

The currently-available Model YSL-682B trombone, made by Yamaha Corporation, includes an example of a rotary valve which (in addition to being ill-suited for two-valve instruments) lacks flow tangency. The stationary tubing attached to the valve is circular in cross-section but the passage through the valve piston is distinctly D-shaped.

And the tubing attached to the valve casing not only includes at least one rather sharp bend adjacent to the casing, such tubing "wraps" over an arc of about 270° and introduces added resistance to air flow. A bend in such tubing protrudes from the bottom of the instrument and uncomfortably into the shoulder of the musician.

Further, the Yamaha valve introduces two bends in each of two air flow passages when the valve is in the switched position for playing lower notes. Since the switched position provides a longer air column, these bends introduce flow resistance at that time when the musician is least able to tolerate them and overcome their resistive effect. Like the Thayer valve discussed below, the Yamaha valve is a relatively new design introduced in an effort to resolve some of the shortcomings of earlier valves.

A few years ago, a rotary valve known as the Thayer valve was introduced, apparently to help overcome the problem of lack of flow tangency. The Thayer valve uses a cone-shaped rotating piston with an air entry passage at the apex end. The air exit passage terminates at the cone base (as does another passage in this two-passage valve) and such terminations are spaced radially outward from the cone center axis through the apex end and perpendicular to the base.

A difficulty with the Thayer valve is that at that portion of the valve adjacent to the base of the piston, the valve is quite thick and usually (and annoyingly) contacts the musician's cheek. In fact, it is not an exaggeration to say that the valve sometimes uncomfortably "digs into" the musician's cheek.

Still another difficulty with the Thayer valve involves the matter of valve lubrication. In professional use, trombone valves are usually lubricated daily. To lubricate the Thayer valve, one must substantially disassemble the instrument and this is annoying and time-consuming.

Still another difficulty with conventional rotary valves involves the matter of weight. The starting material for the rotating pistons of known disc-shaped rotary valves is a solid bar or rod of brass. Passages are milled or otherwise formed in the rod.

A new rotary valve for brass instruments (and method for making such a valve) which offers straight-through flow passages, which does not interfere with the musician's person, which uses only gradual bends and which is light in weight would be an important advance in the art.

OBJECTS OF THE INVENTION

It is an object of the invention to provide a new valve for brass instruments overcoming some of the problems and shortcomings of the prior art.

Another object of the invention is to provide a new valve for brass instruments which has straight-through air flow paths in the switched, "low note" position.

Another object of the invention is to provide a new valve for brass instruments which does not interfere with the musician's cheek or any other part of the person.

Yet another object of the invention is to provide a new valve for brass instruments using, in the unswitched position, an air flow path having only gradual bends.

Still another object of the invention is to provide a new valve for brass instruments which provides flow tangency in all passages and in both the switched and unswitched positions.

Another object of the invention is to provide a new valve for brass instruments which is light in weight.

Yet another object of the invention is to provide an improved method for making a new valve for brass instruments having the aforementioned advantages.

How these and other objects are accomplished will become more apparent from the following descriptions and from the drawing.

SUMMARY OF THE INVENTION

The invention involves a valve suited for brass instruments (and, particularly, for trombones) having a valve casing and a piston with first and second outer passages and a central passage between the outer passages. A first pair of tubes is connected to the casing for flowing air from the handslide and a second pair of tubes is connected to the casing for flowing air to the bell. (Persons familiar with trombones and other brass instruments will appreciate that all tubes flow air toward the bell; the above terminology is to differentiate between tube pairs and, in the case of the first tubes, does not exclude flowing air to the bell.)

A piston is mounted in the casing for rotating movement between an unswitched position and a switched position (as such positions are referred to by trombonists and by trombone manufacturers). When the piston is in the first position, it results in an instrument air column having a first length. On the other hand, when the piston is in the switched position, it results in an instrument air column having a second, longer length. To put it another way, the piston changes air column length by switching segments of tube into or out of the air column "circuit."

In the inventive improvement, the first outer passage and the first pair of tubes extend along a common axis when the piston is in the switched position. The passage and the pair of tubes thus provides "straight through" air flow and instrument resistance to air flow is substantially reduced in the switched position.

This is a significant feature since the switched position is commonly used to produce notes on lower registers. To produce such notes, the air column is lengthened over that used for higher notes. The lengthened air column inherently offers more resistance to the instrumentalist and, thus, inherently tends to reduce the maximum sound "volume" available from that instrument by that instrumentalist. Thus, any steps taken to reduce air flow resistance provides a better "feel" to the instrumentalist and helps get more sound volume when playing lower notes.

In a highly preferred arrangement, the cross-sectional shapes of the first outer passage and each of the first pair of tubes are substantially the same, e.g., circular. Further, it is also preferred that the cross-sectional areas of the first outer passage and each of the first pair of tubes be substantially the same, thereby providing what is generally known in the industry as "flow tangency" which, in the invention, is between the first outer passage and the first pair of tubes. Flow tangency is achieved when the edges of two adjacent openings, e.g., a passage exit opening and the adjacent tube entry opening (or a tube exit opening and the adjacent passage entry opening), are in registry. When so configured, there is a smooth transition surface (substantially devoid of discontinuity) over which air can flow.

In another aspect of the invention, the axis mentioned above is further identified as a common first axis and the second outer passage and the second pair of tubes extend along a common second axis when the piston is in the switched position. As with the first outer passage and the first pair of tubes, it is preferred that the cross-sectional shapes of the second outer passage and each of the second pair of tubes are substantially the same, e.g., a circle. And it is also preferred that the cross-sectional areas of the second outer passage and each of the second pair of tubes are substantially the same so that flow tangency is provided between the second outer passage and the second pair of tubes. The tubes and casing resemble a circle with two straight lines intersecting the circle. If the tubes were extended across the casing, they would appear as chords of the circle.

In the highly preferred arrangement of the new valve, the piston ducts defining the straight outer passages are attached "chord-like" to an annular piston ring which rotates in the casing. The duct defining the central passage is somewhat S-shaped and has a pair of end axes and an interior axis extending between the end axes. The interior axis and either end axis define an obtuse angle therebetween of about 121 degrees.

More specifically, the end axes comprise a first end axis and a second end axis. When the valve is in the unswitched position, the first end axis is substantially coincident with the common first axis and the second end axis is substantially coincident with the common second axis. Such placement of the end axes helps provide a smooth air flow transition between the central passage and the tubes with which it communicates.

The piston rotates through an angle less than about 70° as the piston is moved between the unswitched position and the switched position. Valve switching is thereby more rapidly accomplished. More preferably, the angle is between 40° and 50° and an angle of about 43° is ideal. This new arrangement is in sharp contrast to earlier disc-shaped valves which require about 90° rotation to move between the unswitched and the switched positions.

As noted above, at least one outer passage is defined by a duct supported by the casing. The duct has a duct wall spaced from the walls of the ducts defining the other passages. More preferably, each of both outer passages as well as the central passage is defined by a separate duct and each duct has a space between it and every other duct. Unlike earlier valves made of solid rod with milled passages, the new valve is substantially hollow and relatively light in weight. Its light weight contributes to the fact that even though it is larger than two inches in diameter (one preferred embodiment is about three inches in diameter), its weight is not objectionable to instrumentalists.

In yet another aspect of the invention, a new method for making a valve for brass instruments includes the steps of providing an annular piston ring and providing a plurality of tube-type air ducts secured to the ring. Each of two ducts is secured chord-like to the ring, i.e., each such duct is substantially straight and intersects two points of the circular ring. Further, each of the ducts has a duct wall with a space between it and the wall of every other duct.

More specifically, one of the straight ducts is a first duct and defines a first outer passage. Another of the ducts is a second duct and defines a second outer passage generally parallel to and spaced from the first outer passage.

The annular valve casing is preferably provided with a first pair of substantially straight tubes connected thereto. The air duct providing step includes the step of securing the first air duct in a position to be coextensive with the first pair of tubes.

In a highly preferred embodiment, the valve casing is also provided with a second pair of substantially straight tubes connected thereto. In that instance, the air duct providing step also includes the step of providing a second air duct secured in a position to be coextensive with the second pair of tubes.

Other details of the invention are set forth in the following detailed description and in the drawing.

DETAILED DESCRIPTION OF PREFERRED EMBODIMENTS

Figure 14:
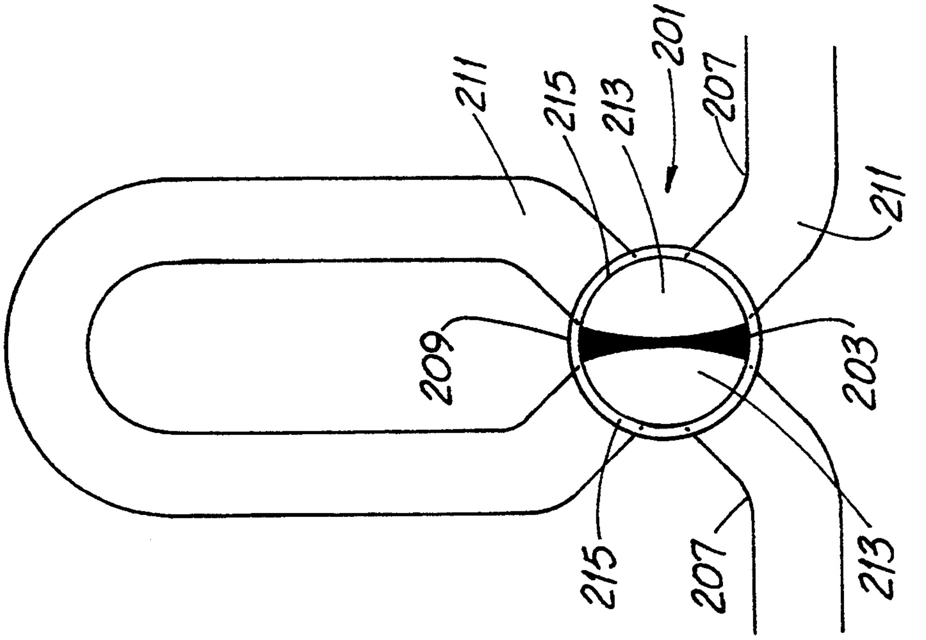
FIG. 14 PRIOR ART
FIGS. 13 and 14 show a prior art valve in the switched and unswitched positions, respectively.
Figure 13:
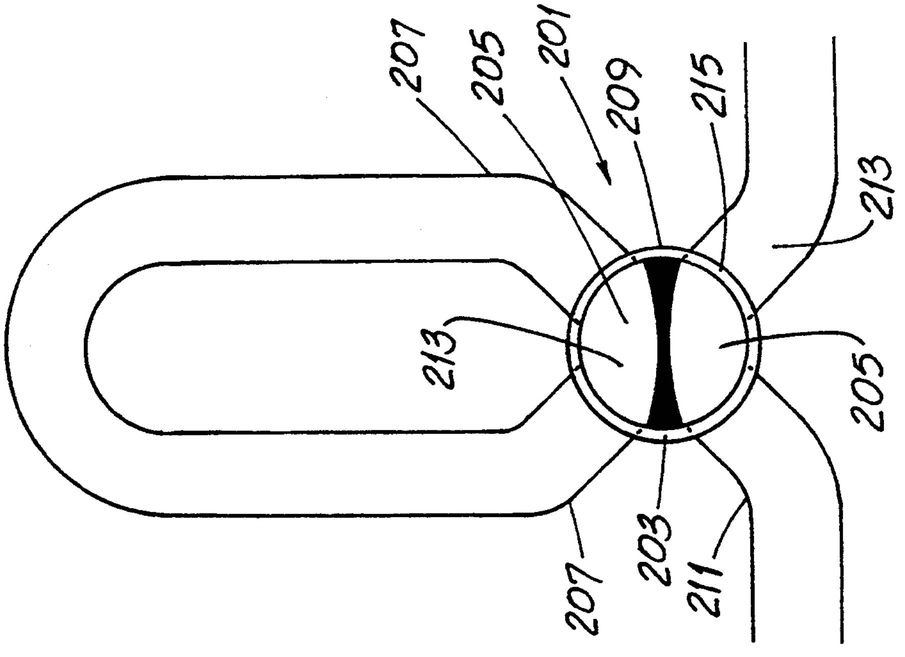
FIG. 13 PRIOR ART

Details of the new valve 10 and of the benefits offered thereby will be better appreciated by first understanding some of the aspects of a prior art valve 201. Referring to FIGS. 13, and 14, an exemplary valve 201 has a solid rotary piston 203 with milled arc-shaped passages 205 of generally elliptical cross-sectional shape. Pieces of tube 207 (of circular cross-section) are attached to the valve casing 209 using relatively sharp bends 211.

When the valve 201 is in the unswitched position (FIG. 13), the air flow paths 213 are significantly curved and, thus, more resistive to air flow than a straight path. And a discontinuity 215 is formed at the intersection of an elliptical passage 205 and a circular tube 207; that is, the illustrated valve lacks flow tangency. When the valve is rotated about 90° to the switched position (FIG. 14) for playing lower notes, each of the air flow paths 213 bends about 180°. It can be said that such paths 213 are almost serpentine. Such paths 213 offer even more resistance to air flow than occurs with the valve 201 in the unswitched position.

In the following description of the invention, there is set forth a brief explanation of an exemplary brass instrument, a trombone, having the new valve 10. After appreciating how the new valve 10 is mounted on a single-valve trombone, a more detailed explanation of the configuration and arrangement of the valve 10 will be more easily appreciated.

Figure 1:
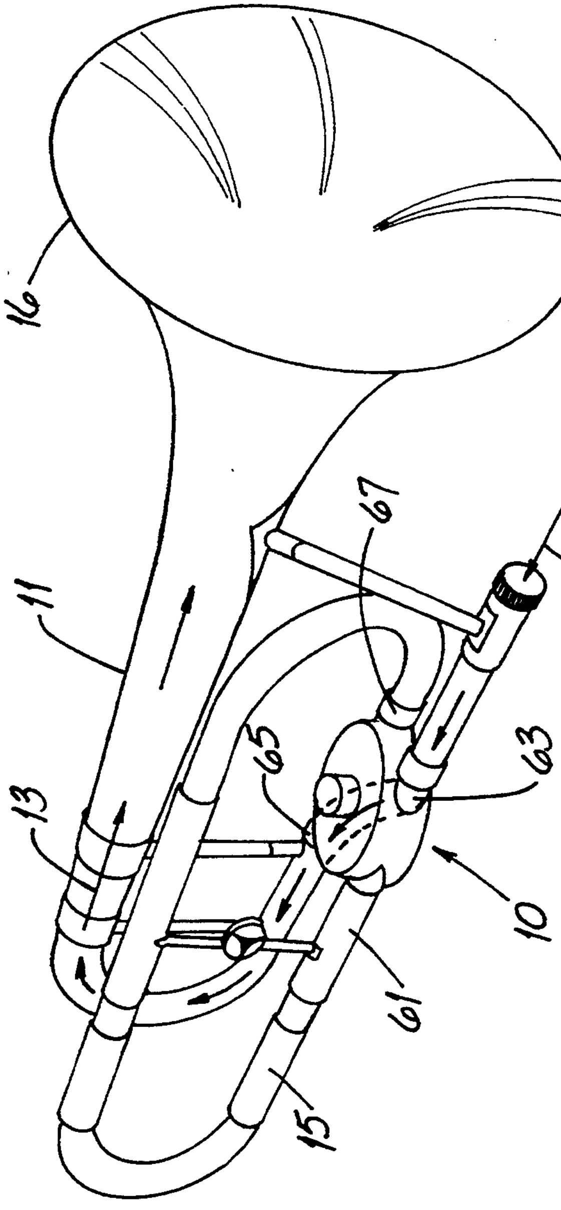
FIG. 1 is a perspective view of an exemplary trombone equipped with the inventive valve. The view shows an air flow path with the valve in a particular position. Trombone parts are omitted.
Figure 2:
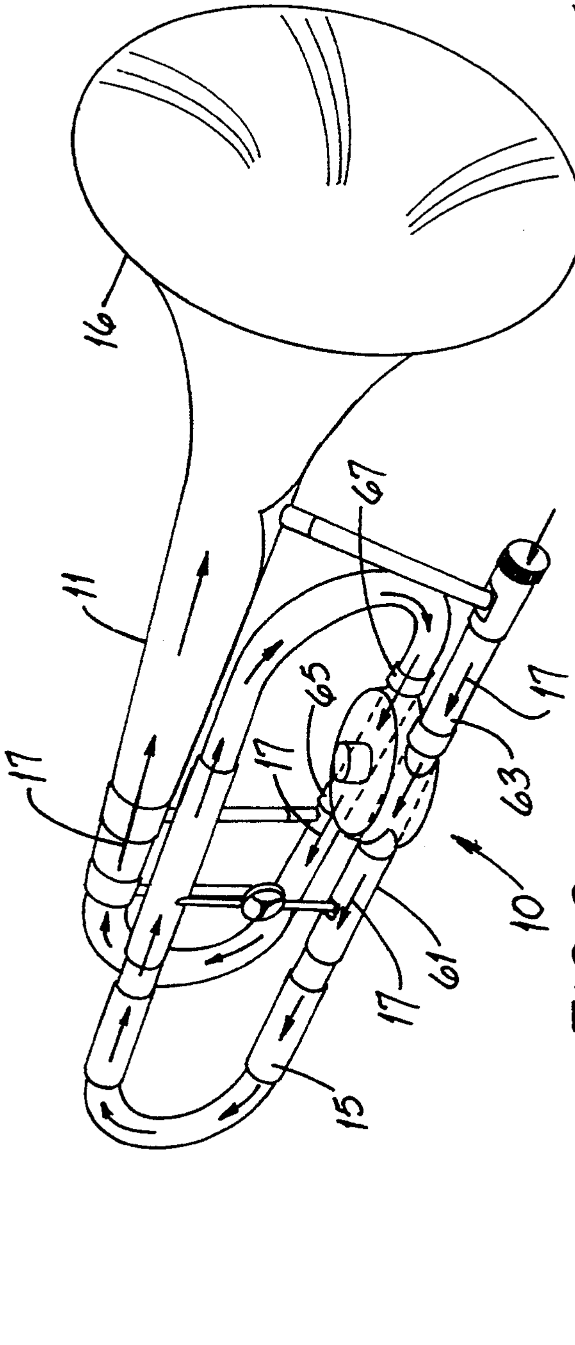
FIG. 2 is a perspective view like that of FIG. 1. The view shows an air flow path with the valve in a position different from that of FIG. 1. Trombone parts are omitted.

FIGS. 1 and 2 show a trombone 11 having the new valve 10. The slide, mouthpiece and appurtenant components are omitted for clarity in explanation. When the valve 10 is in the unswitched position (FIGS. 1 and 6) for the key of B flat, air from the handslide flows in the direction of the arrows 13 and the tube 15 is not included in the air flow path from the mouthpiece to the bell. When the valve 10 is in the switched position (FIGS. 2 and 7) for the key of F, such air flows in the direction of the arrows 17 and the tube 15 is a part of the air flow path from the mouthpiece to the bell.

Figure 4:
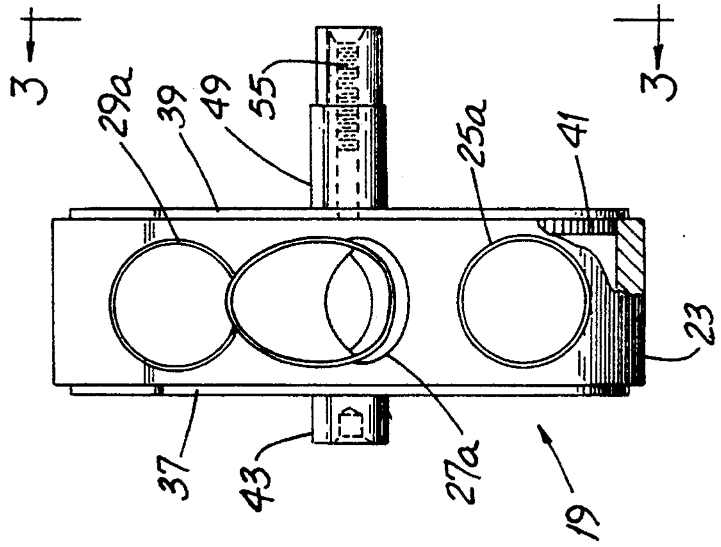
FIG. 4 is a side elevation view of the inventive valve. Parts are shown in dashed outline, other parts are broken away and a part is shown in section.
Figure 3:
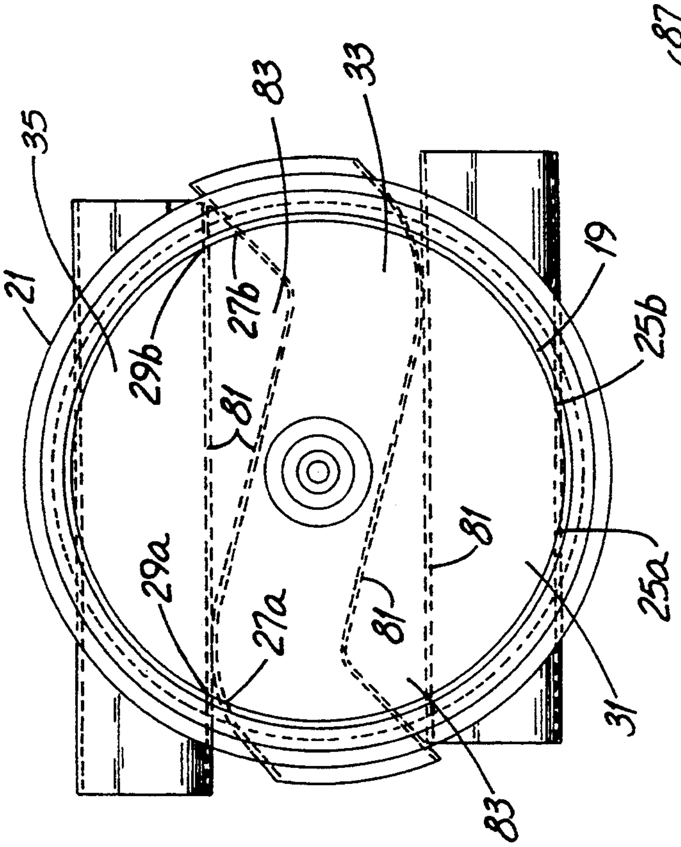
FIG. 3 is a top plan view of the inventive valve taken along the viewing plane 3—3 of FIG. 4. Parts are shown in dashed outline and other parts are broken away.

Referring next to FIGS. 3 and 4, the improved valve 10 includes a generally disc-shaped piston 19 which rotates over a portion of a revolution within a stationary, annular casing 21. The piston 19 has an annular ring 23 with apertures 25*a*, 25*b* through it to receive and support the ends of a first outer duct 31, a second outer duct 35 and a central duct 33 positioned generally between the outer ducts 31, 35. The outer ducts 31, 35 are secured chord-like to the ring 23 as by brazing, soldering or the like. The central duct 33 is somewhat S-shaped and its ends are similarly secured to and supported by the ring 23.

The piston 19 also has a bottom plug 37 and a top plug 39, both of which are generally disc-shaped. Each plug 37, 39 includes a knurled portion 41 which is pressed into the piston ring 19 and thereafter, the plugs 37, 39 are permanently attached to the ring 19 by brazing.

Figure 5:
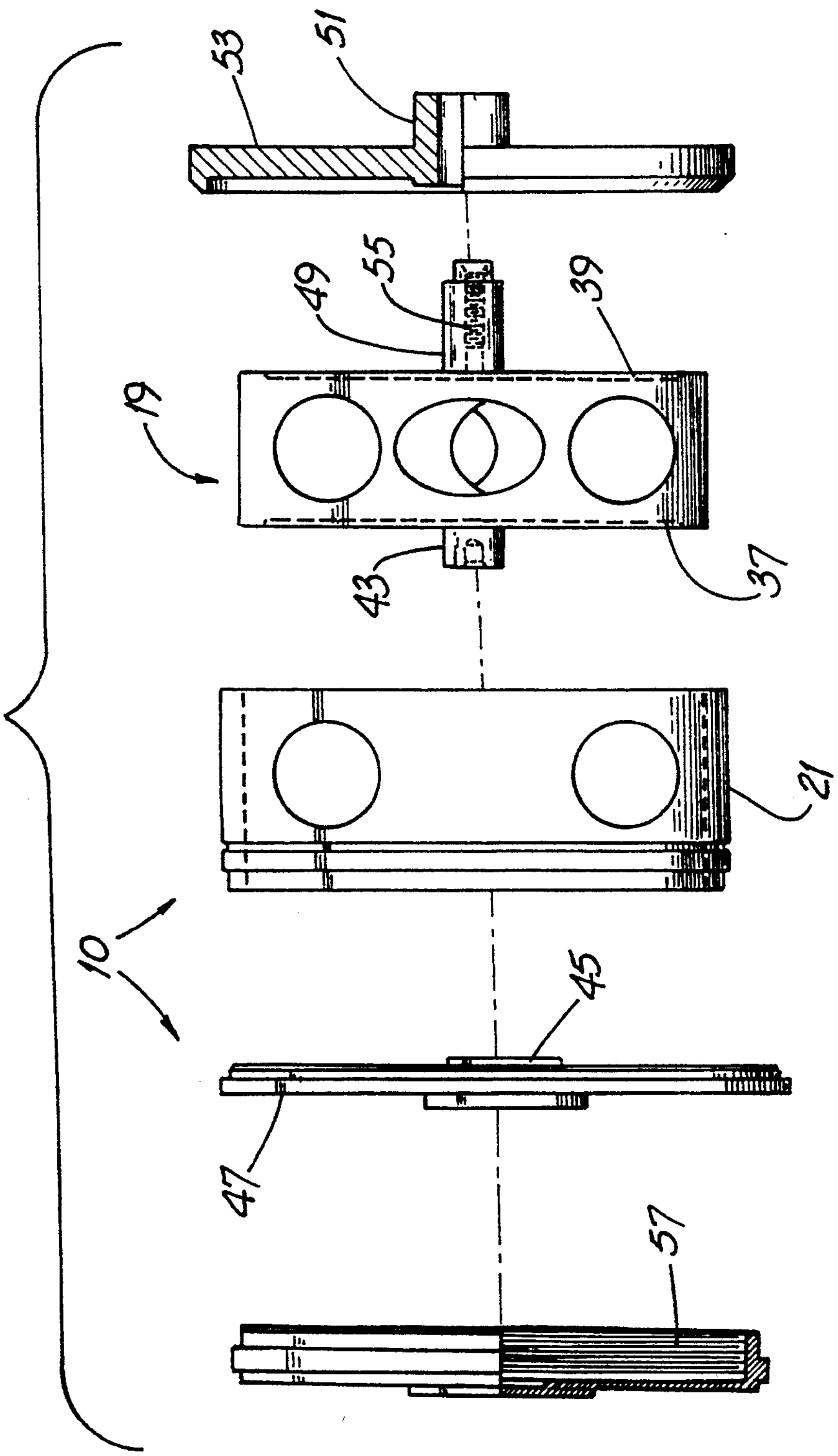
FIG. 5 is an exploded side elevation view of the inventive valve.

Referring also to FIG. 5, the bottom plug 37 has a short bearing 43 which extends into a pocket 45 in the disc-shaped casing bearing 47. The top plug 39 has a long bearing 49 extending through a bushing 51 in the casing bottom cap 53, the latter being permanently attached to the casing 21. Such long bearing 49 has a threaded interior hole 55 for attachment of the valveactuating components. A removable bottom cap 57 is threaded to the casing 21 and "captures" the bearing 21 and the piston 19 within the casing 21.

The manufacturing steps for the valve 10 include machining a very slight taper on the exterior of the piston 19 and on the interior of the casing 21. As the valve 10 wears slightly, the piston 19 can thereby move in the direction of the long bearing 49 and automatically retain substantially air-sealing fit between the piston 19 and the casing 21. To lubricate the new valve 10, one need only remove the bottom cap 57 and the bearing 47, apply a few drops of oil to the bearing 47, reassemble the bearing 47 in the casing 21 and re-attach the bottom cap 57.

Figure 6:
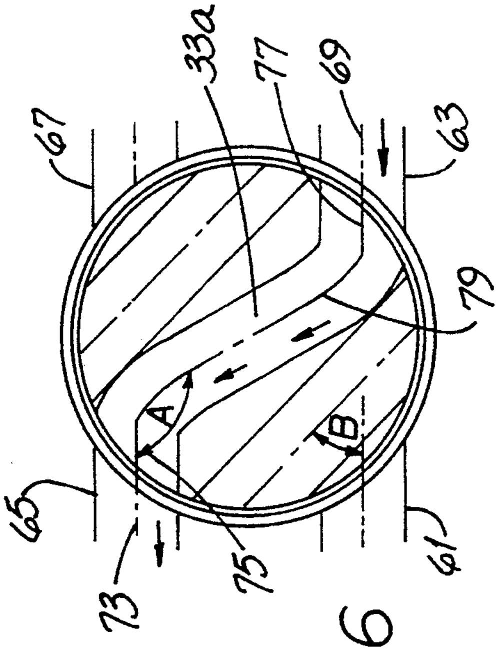
FIG. 6 is a representative view showing the position of the valve which provides the air flow path shown in FIG. 1.
Figure 7:
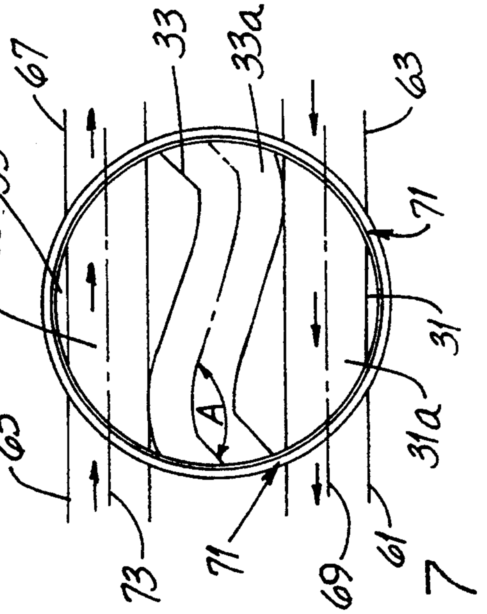
FIG. 7 is a representative view showing the position of the valve which provides the air flow path shown in FIG. 2.

FIGS. 6 and 7 illustrate four tubes 61, 63, 65, 67 which are attached to the valve casing 21. To help correlate these tubes 61, 63, 65, 67 to the instrument, such tubes 61, 63, 65, 67 are correspondingly identified in FIGS. 1 and 2.

The first outer passage 31*a* and the first pair of tubes 61, 63 extend along a common axis 69 when the piston 19 is in the switched position as shown in FIG. 7. The passage 31*a* and the pair of tubes 61, 63 thus provides "straight-through" air flow and instrument resistance to air flow is substantially reduced in the switched position.

It is to be appreciated that unlike, for example, the Yamaha valve described above, the valve 10 provides such straight-through air flow in the switched position which is used to produce notes on lower registers. This feature reduces air flow resistance at a time when the instrument is configured to have a longer air column.

In a highly preferred arrangement, the cross-sectional shapes of the first outer passage 31*a* and each of the first pair of tubes 61, 63 are substantially the same, e.g., circular. Further, it is also preferred that the cross-sectional areas of the first outer passage 31*a* and each of the first pair of tubes 61, 63 be substantially the same, thereby providing what is generally known in the industry as "flow tangency" which, in the invention, is represented by the arrow 71 identifying the smooth transition between the first outer passage 31*a* and the first pair of tubes 61, 63. Flow tangency is achieved when the edges of two adjacent openings, e.g., a passage exit opening and the adjacent tube entry opening (or a tube exit opening and the adjacent passage entry opening), are in registry. When so configured, there is a smooth transition surface (substantially devoid of discontinuity) over which air can flow.

The axis 69 mentioned above is further identified as a common first axis and the second outer passage 35*a* and the second pair of tubes 65, 67 extend along a common second axis 73 when the piston 19 is in the switched position. As with the first outer passage 31*a* and the first pair of tubes 61, 63, it is preferred that the cross-sectional shapes of the second outer passage 35*a* and each of the second pair of tubes 65, 67 are substantially the same, e.g., a circle. And it is also preferred that the cross-sectional areas of the second outer passage 35*a* and each of the second pair of tubes 65, 67 are substantially the same so that flow tangency is provided therebetween.

In the highly preferred arrangement of the new valve 10, the piston ducts 31, 35 defining the straight outer passages are attached "chord-like" to the piston ring 23 which rotates in the casing 21. The duct 33 defining the central passage 33*a* is somewhat S-shaped and has a pair of end axes 75, 77 and an interior axis 79 extending between the end axes 75, 77 . The interior axis 79 and either end axis 75 or 77 define an obtuse angle "A" therebetween of about 121 degrees.

More specifically, the end axes 75, 77 comprise a first end axis and a second end axis. When the valve is in the unswitched position, the first end axis 77 is substantially coincident with the common first axis 69 and the second end axis 75 is substantially coincident with the common second axis 73. Such placement of the end axes 75, 77 helps provide a smooth air flow transition between the central passage 33*a* and the tubes 63, 65 with which it communicates.

A comparison of FIGS. 6 and 7 demonstrates that the piston 19 rotates through an angle "B" less than about 70° as the piston 19 is moved between the unswitched position and the switched position. Valve switching is thereby more rapidly accomplished. More preferably, the angle "B" is between 40° and 50° and an angle "B" of about 43° is ideal. This new arrangement is in sharp contrast to earlier disc-shaped valves which require about 90° rotation to move between the unswitched and the switched positions.

As noted above, at least one outer passage, e.g., passage 31*a*, is defined by a duct 31 supported by the casing 21. The duct 31 has a duct wall 81 spaced from the walls 81 of the ducts 33, 35 defining the other passages 33*a*, 35*a*. More preferably, each of both outer passages 31*a*, 35*a* as well as the central passage 33*a* is defined by a separate duct 31, 35, 33, respectively, and each duct 31, 33, 35 has a space 83 between it and every other duct 31, 33, 35. Unlike earlier valves made of solid rod with milled passages, the new valve 10 is substantially hollow and relatively light in weight. Its light weight contributes to the fact that even though it is larger than two inches in diameter (one preferred embodiment is about three inches in diameter), its weight is not objectionable to instrumentalists.

In yet another aspect of the invention, a new method for making a valve 10 for brass instruments includes the steps of providing an annular piston ring 23 and providing a plurality of tube-type air ducts 31, 35 secured to the ring 23. Each of two ducts 31, 35 is secured chord-like to the ring 23, i.e., each such duct 31, 35 is substantially straight and intersects two points of the circular ring 23.

The annular valve casing 21 is preferably provided with a first pair of substantially straight tubes, e.g., tubes 61 and 63, connected thereto. The air duct providing step includes the step of securing the first air duct 31 in a position to be coextensive with the first pair of tubes 61, 63.

In a highly preferred embodiment, the valve casing 21 is also provided with a second pair of substantially straight tubes 65, 67 connected thereto. In that instance, the air duct providing step also includes the step of providing a second air duct 35 secured in a position to be coextensive with the second pair of tubes 65, 67.

Figure 8:
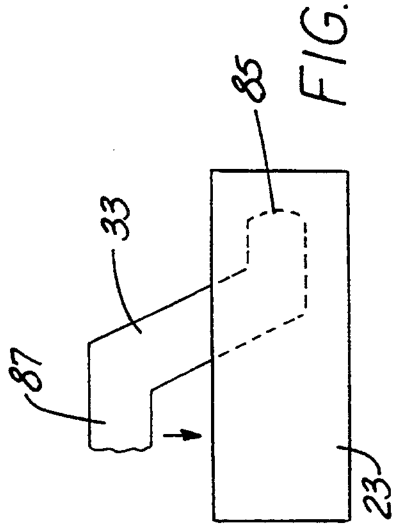
FIG. 8 is a simplified side elevation view of the casing and the central duct components of the valve.

Because of its shape, the third, generally S-shaped central duct 33 is mounted in the piston ring 23 by orienting the duct 33 as shown in FIG. 8, inserting an end 85 into an aperture 27*b* in the ring 23 and then swinging the other end 87 down into the ring 23. The duct 33 is then urged in such a direction that the other end 87 is inserted through its corresponding aperture 27*a* in the ring 23.

FIGS. 9A, 10A, 11A and 12A illustrate an arrangement involving valves 10*a* and 10*b* as such valves are used in a two-valve trombone 11. FIGS. 9B, 10B, 11B and 12B (which relate to FIGS. 9A, 10A, 11A and 12A, respectively) show various trombone air flow paths when each of the valves 10*a*, 10*b* is positioned as described below.

Figure 9A:
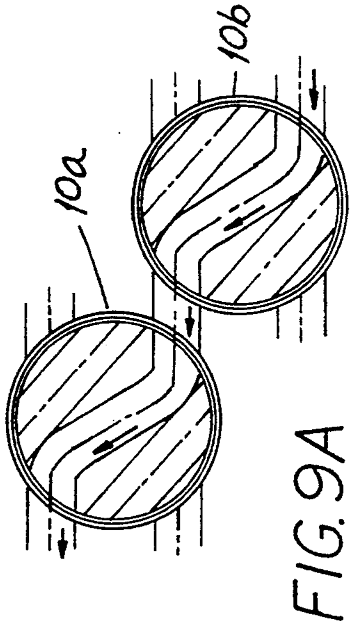
FIGS. 9A, 10A, 11A and 12A are representative views showing the various combinations of positions for two valves mounted on an exemplary two-valve trombone.
Figure 9B:
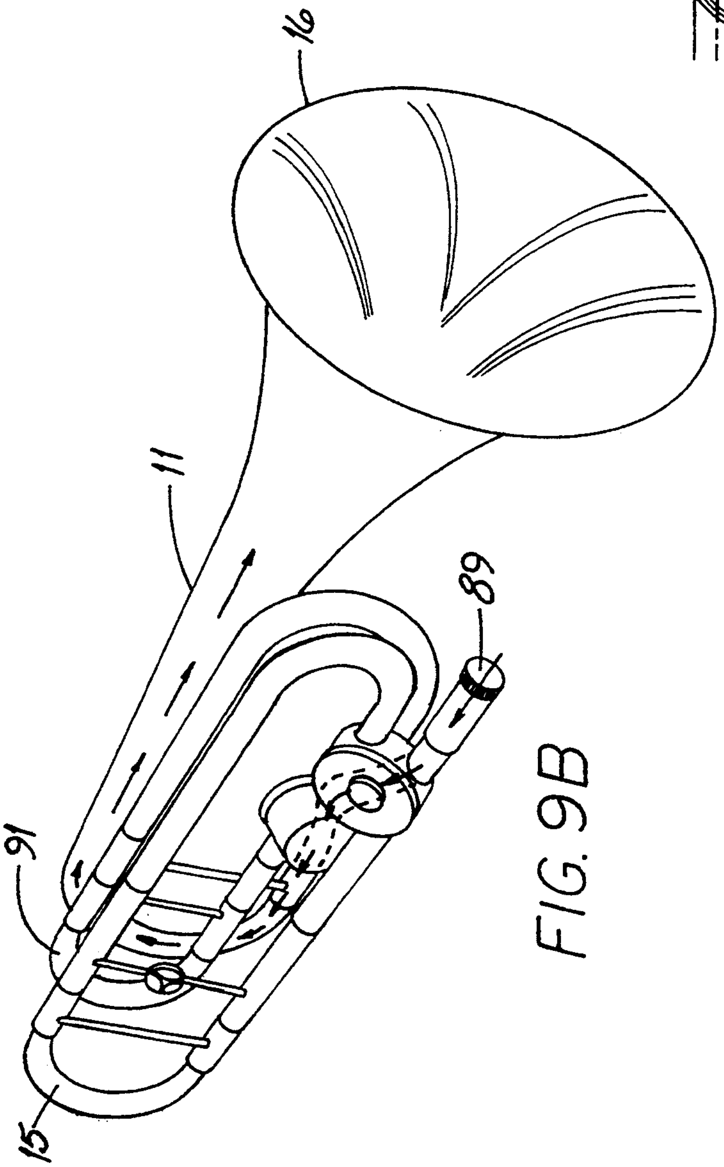
FIGS. 9B, 10B, 11B and 12B (relating to FIGS. 9A, 10A, 11A and 12A, respectively) are perspective views of an exemplary trombone equipped with two of the inventive valves. The views show an air flow path with each of the two valves in a particular position. Trombone parts are omitted.
Figure 10A:
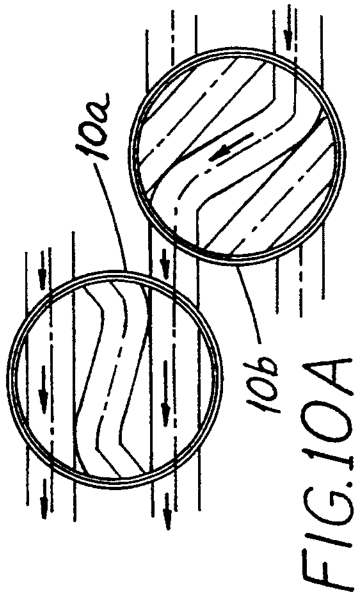
Figure 10B:
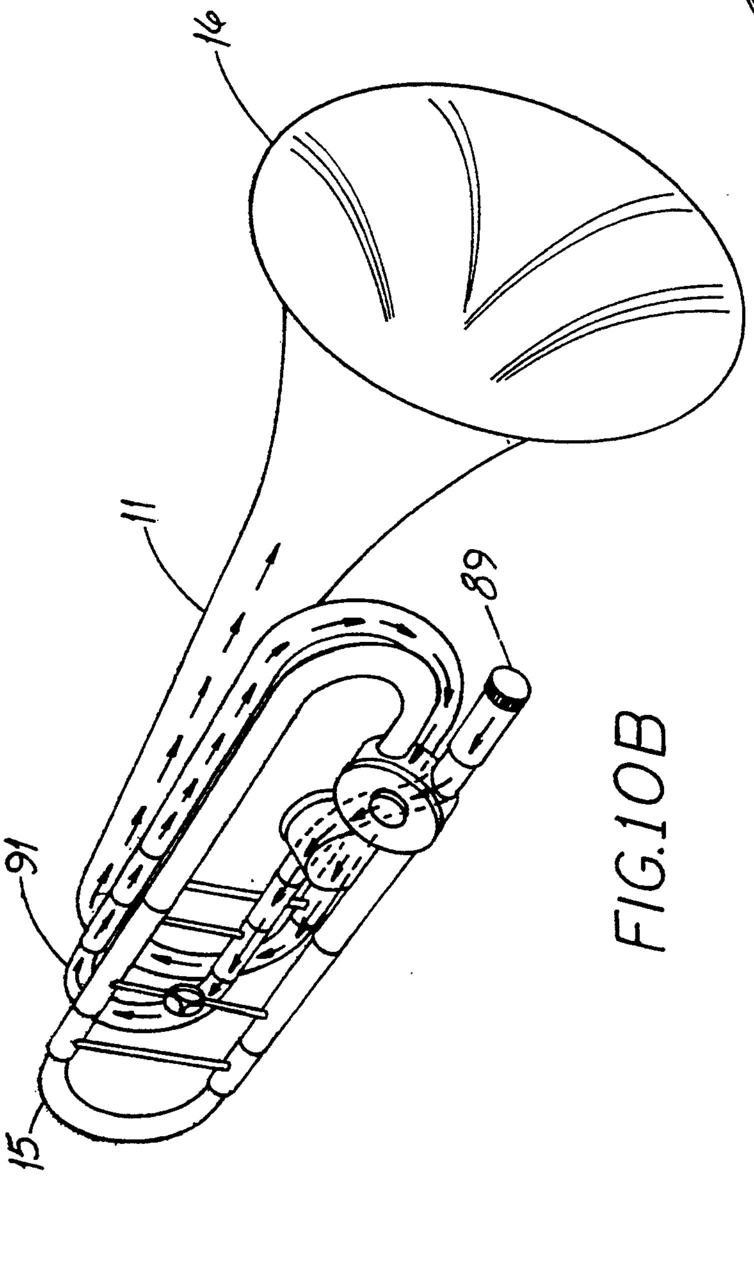

In FIG. 9A, both valves 10*a*, 10*b* are in the unswitched position and the resulting flow path, nominally about 108 inches long, is represented by the blackened portions of FIGS. 9A and 9B. In FIG. 10A, the first valve 10*a* is moved to the switched position and the resulting flow path, now roughly 136 inches long, is represented by the blackened portions of FIGS. 10A and 10B.

Figure 11A:
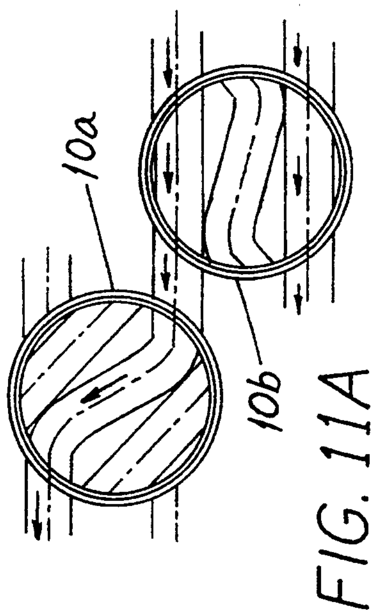
Figure 11B:
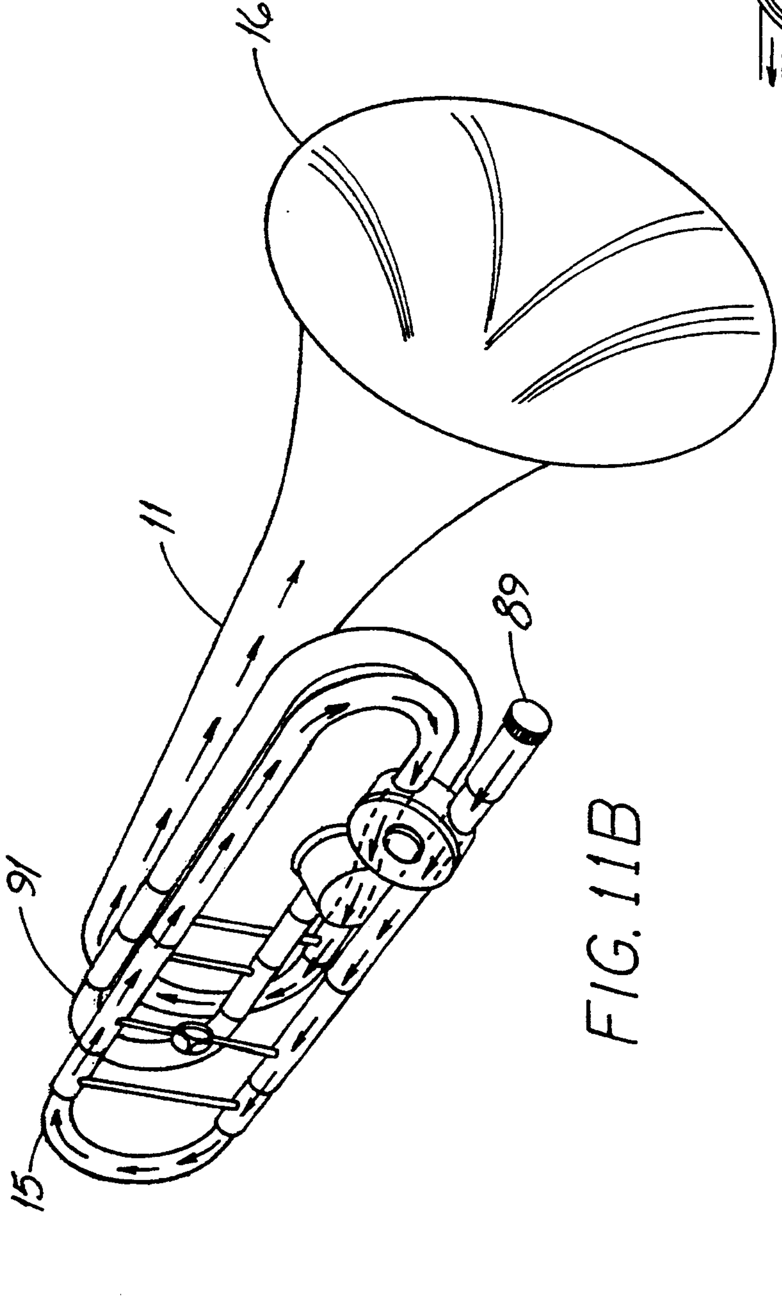
Figure 12A:
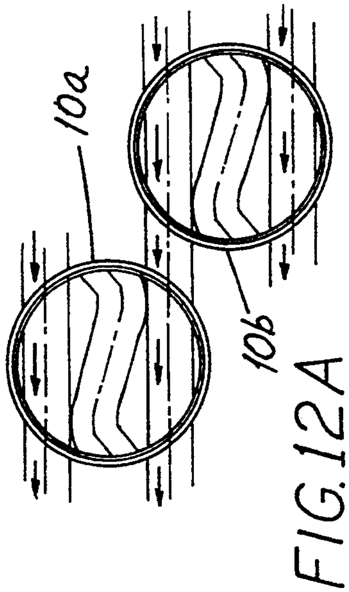
Figure 12B:
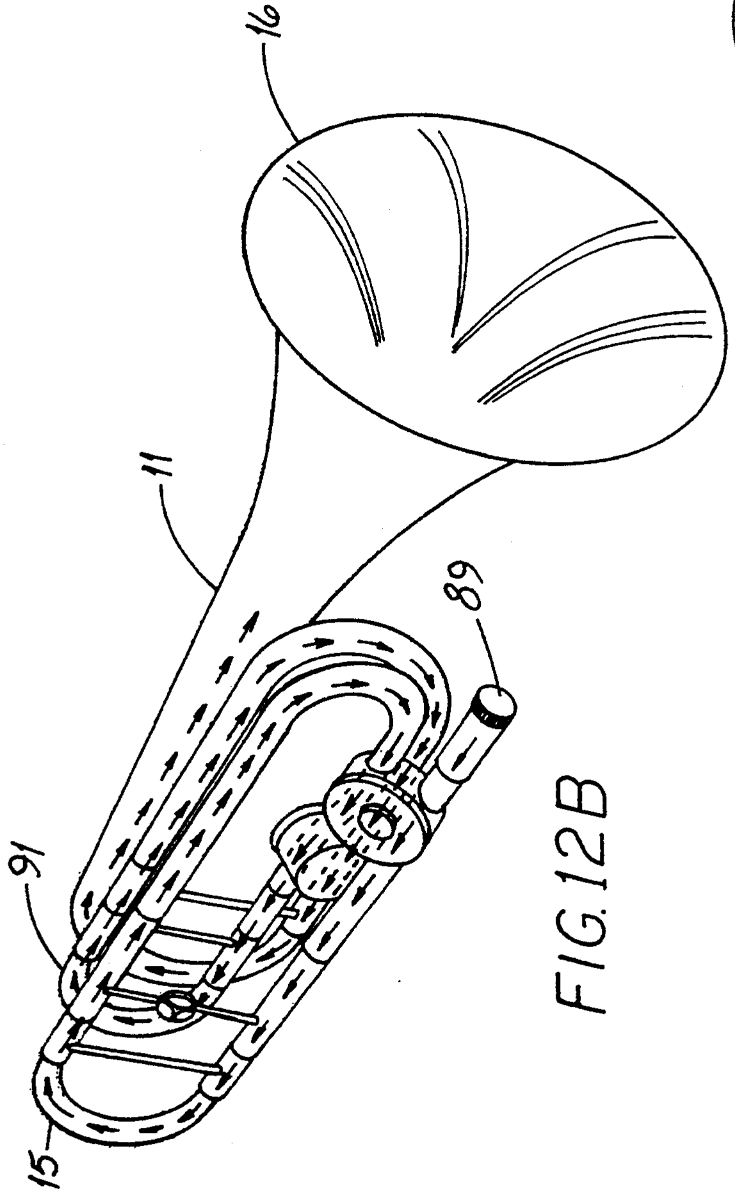

In FIG. 11A, the second valve 10*b* is moved to the switched position and the resulting flow path, now roughly 144 inches long, is represented by the blackened portion of FIGS. 11A and 11B. In FIG. 12A, both valves 10*a*, 10*b* are moved to the switched position and the resulting flow path, now roughly 172 inches long, is represented by the blackened portion of FIGS. 12A and 12B.

It will be helpful to explain FIGS. 9A, 10B, 11B and 12*b* in another way. Air from the mouthpiece and the hand slide flows into the tube 89 and out the bell 16. When the valves 10*a*, 10*b* are positioned as in FIG. 9A, neither tube 15 nor tube 91 form part of the flow path. When the valves 10*a*, 10*b* are positioned as in FIG. 10A, tube 91 forms part of the flow path but tube 15 (which is about 8 inches longer than tube 91) does not.

When the valve 10*a*, 10*b* are positioned as in FIG. 11A, tube 15 forms part of the flow path but tube 91 does not. When the valves 10*a*, 10*b* are positioned as in FIG. 12A, both tubes 15, 91 form part of the flow path.

While the principles of this invention have been described in connection with specific embodiments, it should be understood clearly that these descriptions are made only by way of example and are not intended to limit the scope of the invention.

We claim:

1. In a valve for a brass instrument and having (a) a valve casing, (b) a piston with first and second outer passages and a central passage between the outer passages, (c) a first pair of tubes connected to the casing and flowing air from the handslide, and (d) a second pair of tubes connected to the casing and flowing air to the bell, and wherein the piston is mounted in the casing for movement between (1) an unswitched position providing an air column having a first length and (2) a switched position providing an air column having a second, longer length, the improvement wherein:

the first outer passage and the first pair of tubes extend along a common axis when the piston is in the switched position, thereby substantially reducing resistance to air flow in the switched position.

2. The valve of claim 1 wherein the cross-sectional shapes of the first outer passage and each of the first pair of tubes are substantially the same.

3. The valve of claim 2 wherein the cross-sectional areas of the first outer passage and each of the first pair of tubes are substantially the same, thereby providing flow tangency between the first outer passage and the first pair of tubes.

4. The valve of claim 3 wherein the cross-sectional shape is substantially a circle.

5. The valve of claim 1 wherein the common axis is a first axis and the second outer passage and the second pair of tubes extend along a common second axis when the piston is in the switched position.

6. The valve of claim 5 wherein the cross-sectional shapes of the second outer passage and each of the second pair of tubes are substantially the same.

7. The valve of claim 6 wherein the cross-sectional areas of the second outer passage and each of the second pair of tubes are substantially the same, thereby providing flow tangency between the second outer passage and the second pair of tubes.

8. The valve of claim 7 wherein the cross-sectional shape of the second outer passage and each of the second pair of tubes is substantially a circle.

9. The valve of claim 1 wherein:

the central passage has a pair of end axes and an interior axis extending between the end axes; and, the interior axis and either end axis define an obtuse angle therebetween.

10. The valve of claim 9 wherein:

the end axes comprise a first end axis and a second end axis, and when the valve is in the unswitched position:

the first end axis is substantially coincident with the common first axis; and, the second end axis is substantially coincident with the common second axis.

11. The valve of claim 1 wherein:

each of the passages is defined by a separate duct;

at least one outer passage is defined by a duct supported by the ring and having a duct wall spaced from the walls of the ducts defining other passages.

12. The valve of claim 11 wherein each of both outer passages and the central passage is defined by a separate duct spaced from every other duct, whereby the valve is substantially hollow and relatively light in weight.

13. The valve of claim 12 wherein such valve is substantially disc-shaped and in excess of two inches in diameter.

14. The valve of claim 1 wherein the piston rotates through an angle less than about 70° as the piston is moved from the unswitched position to the switched position, whereby valve switching is more rapidly accomplished.

15. The valve of claim 14 wherein the angle is between 40° and 50°.

16. A method for making a trombone valve including the steps of:

providing an annular piston ring; and providing a plurality of air ducts, each of the ducts being linear and being attached to the ring at two locations on the ring.

17. The method of claim 16 wherein each of the ducts has a duct wall spaced from the wall of another duct.

18. The method of claim 17 wherein one of the ducts is a first duct and defines a first outer passage and another of the ducts is a second duct and defines a second outer passage generally parallel to the first outer passage.

19. The method of claim 16 further including the steps of:

providing an annular valve casing having a first pair of substantially straight tubes connected thereto, and wherein the air duct providing step includes the step of:

securing the first air duct in a position to be coextensive with the first pair of tubes when the valve is in the switched position.

20. The method of claim 19 wherein the valve casing also has a second pair of substantially straight tubes connected thereto, and wherein the air duct providing step also includes the step of:

providing a second air duct secured in a position to be coextensive with the second pair of tubes when the valve is in the switched position.

* * * * *